(12) United States Patent
Dai et al.

(10) Patent No.: US 9,132,742 B2
(45) Date of Patent: Sep. 15, 2015

(54) ELECTRIC VEHICLE (EV) CHARGING INFRASTRUCTURE WITH CHARGING STATIONS OPTIMUMALLY SITED

(75) Inventors: Jing D. Dai, White Plains, NY (US); Ajay A. Deshpande, White Plains, NY (US); Younghun Kim, White Plains, NY (US); Ming Li, Elmsford, NY (US); Pavankumar Murali, Haverstraw, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 13/403,046

(22) Filed: Feb. 23, 2012

(65) Prior Publication Data

US 2013/0222158 A1 Aug. 29, 2013

(51) Int. Cl.
*G08G 1/123* (2006.01)
*B60L 11/18* (2006.01)
*G06Q 50/30* (2012.01)

(52) U.S. Cl.
CPC ......... *B60L 11/1816* (2013.01); *B60L 11/1844* (2013.01); *G06Q 50/30* (2013.01); *B60L 2200/12* (2013.01); *B60L 2200/18* (2013.01); *B60L 2230/40* (2013.01); *B60L 2240/622* (2013.01); *B60L 2240/68* (2013.01); *B60L 2240/70* (2013.01); *B60L 2240/72* (2013.01); *B60L 2240/80* (2013.01); *Y02E 60/721* (2013.01); *Y02T 10/7005* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y04S 10/126* (2013.01)

(58) Field of Classification Search
USPC ..................................... 340/995.13
See application file for complete search history.

(56) References Cited

U.S. PATENT DOCUMENTS

| | | | |
|---|---|---|---|
| 3,256,427 A | 6/1966 | Jackson, Jr. | |
| 5,805,446 A | 9/1998 | Hatakeyama et al. | |
| 6,356,836 B1 | 3/2002 | Adolph | |
| 6,629,034 B1 | 9/2003 | Kozak et al. | |
| 8,560,216 B1 * | 10/2013 | Kahn et al. | 701/123 |
| 2004/0230680 A1 | 11/2004 | Jain et al. | |
| 2006/0293046 A1 | 12/2006 | Smith | |
| 2007/0005224 A1 * | 1/2007 | Sutardja | 701/117 |
| 2008/0262711 A1 * | 10/2008 | Rosen et al. | 701/119 |
| 2009/0313104 A1 * | 12/2009 | Hafner et al. | 705/14.25 |

(Continued)

OTHER PUBLICATIONS

Bapna, et al., "Infrastructure development for conversion to environmentally friendly fuel", "European Journal of Operational Research", 2002.

(Continued)

*Primary Examiner* — Naomi Small
(74) *Attorney, Agent, or Firm* — Law Office of Charles W. Peterson, Jr.; Louis J. Percello, Esq.

(57) ABSTRACT

A system, method and program product for siting charging stations. A mobility detection module collects traffic data from vehicle sensors distributed in an area. A map matching module maps detected traffic in the area. A vehicle flow module temporally characterizes mapped traffic flow. An electric vehicle (EV) requirements (EVR) evaluator determines an optimal number of charging stations and respective locations for siting the charging stations.

21 Claims, 5 Drawing Sheets

(56) References Cited

U.S. PATENT DOCUMENTS

| | | | |
|---|---|---|---|
| 2010/0004905 A1 | 1/2010 | Aldajani | |
| 2010/0049737 A1* | 2/2010 | Ambrosio et al. | 707/104.1 |
| 2010/0138142 A1 | 6/2010 | Pease | |
| 2011/0050168 A1* | 3/2011 | Yoo et al. | 320/109 |
| 2011/0071932 A1* | 3/2011 | Agassi et al. | 705/34 |
| 2011/0246252 A1* | 10/2011 | Uesugi | 705/7.12 |
| 2011/0288765 A1* | 11/2011 | Conway | 701/201 |
| 2012/0013302 A1* | 1/2012 | Genzel et al. | 320/109 |
| 2012/0200260 A1* | 8/2012 | Karner et al. | 320/109 |
| 2012/0203726 A1* | 8/2012 | Klabjan | 706/46 |
| 2013/0002188 A1* | 1/2013 | Uyeki | 320/101 |
| 2013/0173331 A1* | 7/2013 | Mohagheghi et al. | 705/7.25 |
| 2013/0179135 A1* | 7/2013 | Kang | 703/8 |
| 2014/0232566 A1* | 8/2014 | Mimeault et al. | 340/935 |

OTHER PUBLICATIONS

Kuby, et al., "Optimization of hydrogen stations in Florida using the Flow-Refueling Location Model", "International Journal of Hydrogen Energy", 2009.

Morrow, K., Karner, D., Francfort, J., Plug-in Hybrid Electric Vehicle Charging Infrastructure Review, United States Department of Energy Report, Contract No. 58517, Nov. 2008.

Nicholas, M. A., Hydrogen station siting and refueling analysis using geographic information systems: a case study of Sacramento County, Institute of Transportation studies, UC Davis, M.S. Thesis, UCD-ITS-RR-04-37, 2004.

Upchurch, C., Kuby, M., Lim, S., A model for location of capacitated alternative-fuel stations, Geographic Analysis, 41, 2009.

Wang, Y-W., An optimal location choice model for recreation-oriented scooter recharge stations, Transportation Research Part D, 12, 2007.

Wang, Y-W., Locating battery exchange stations to serve tourism transport: A note, Transportation Research Part D, 13, 2008.

Wang, Y-W., Lin, C-C., LOcating road-vehicle refueling stations, Transportation Research Part E, 45, 2009.

* cited by examiner

ELECTRIC VEHICLE (EV) CHARGING INFRASTRUCTURE WITH CHARGING STATIONS OPTIMUMALLY SITED

BACKGROUND OF THE INVENTION

1. Field of the Invention

The present invention is related to transportation and more particularly to locating charging stations for electric vehicles (EVs).

2. Background Description

The typical electric vehicle (EV) operates on a large on board energy storage cell or rechargeable battery. EV battery capacity limits the distances EVs can travel on a single charge. Historically, high capacity batteries and sufficiently large, high efficiency electric motors for long range travel have been unavailable. So, EV travel distances have been relatively short. The expected remaining range for each EV depends upon the distance travelled, road topology, traffic conditions and weather conditions. Morrow et al., "Plug-in Hybrid Electric Vehicle Charging Infrastructure Review," US DOE Report, Contract No. 58517, November 2008, notes that in the absence of commercial charging stations, the EV charge depletion range falls from 40 to 13 miles if charging stations are available outside residences. Most EV drivers have sufficient charge capacity at home for short-range, local travel. Frequently however, drivers are in a situation where vehicles must be refueled away from home, e.g. at workplace, a shopping center or an event location.

Unfortunately, current EV infrastructure has few, sparsely located commercial charging stations. Typically, charging stations are placed at locations haphazardly selected, on an ad hoc basis. However, those locations may not be suited for EV traffic and/or charging needs, where a recharge may typically take several hours. This current EV infrastructure has been, therefore, an impediment to widespread adoption of EVs. The travel distances between charging stations, where available, has suppressed EV popularity. In 2000 there were only 9,367 EV in operation in the U.S. More recently, because designers focused on developing higher capacity batteries and increasing electric motor efficiency and capacity, EV popularity has been steadily increasing. On the low end, Pike Research estimates that the yearly U.S. sales of EVs will increase to 204, 110 by 2015. The Federal government has set goals to have about 1 million EVs on road by 2015. However, continuing this trend (and inherent in these estimates), requires adequate EV infrastructure with geographically distributed recharge capacity.

Thus, there is a need for EV infrastructure with commercial EV charging stations located based on demand for the service.

SUMMARY OF THE INVENTION

A feature of the invention is EV infrastructure with optimally located EV charging stations;

Another feature of the invention is EV infrastructure with demand based locations for EV charging stations;

Yet another feature of the invention is determining optimal locations for EV charging stations for satisfying demand.

The present invention relates to a system, method and program product for siting charging stations. A mobility detection module collects traffic data from vehicle sensors distributed in an area. A map matching module maps detected traffic in the area. A vehicle flow module temporally characterizes mapped traffic flow. An electric vehicle (EV) requirements (EVR) evaluator determines an optimal number of charging stations and respective locations for siting the charging stations.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1A:
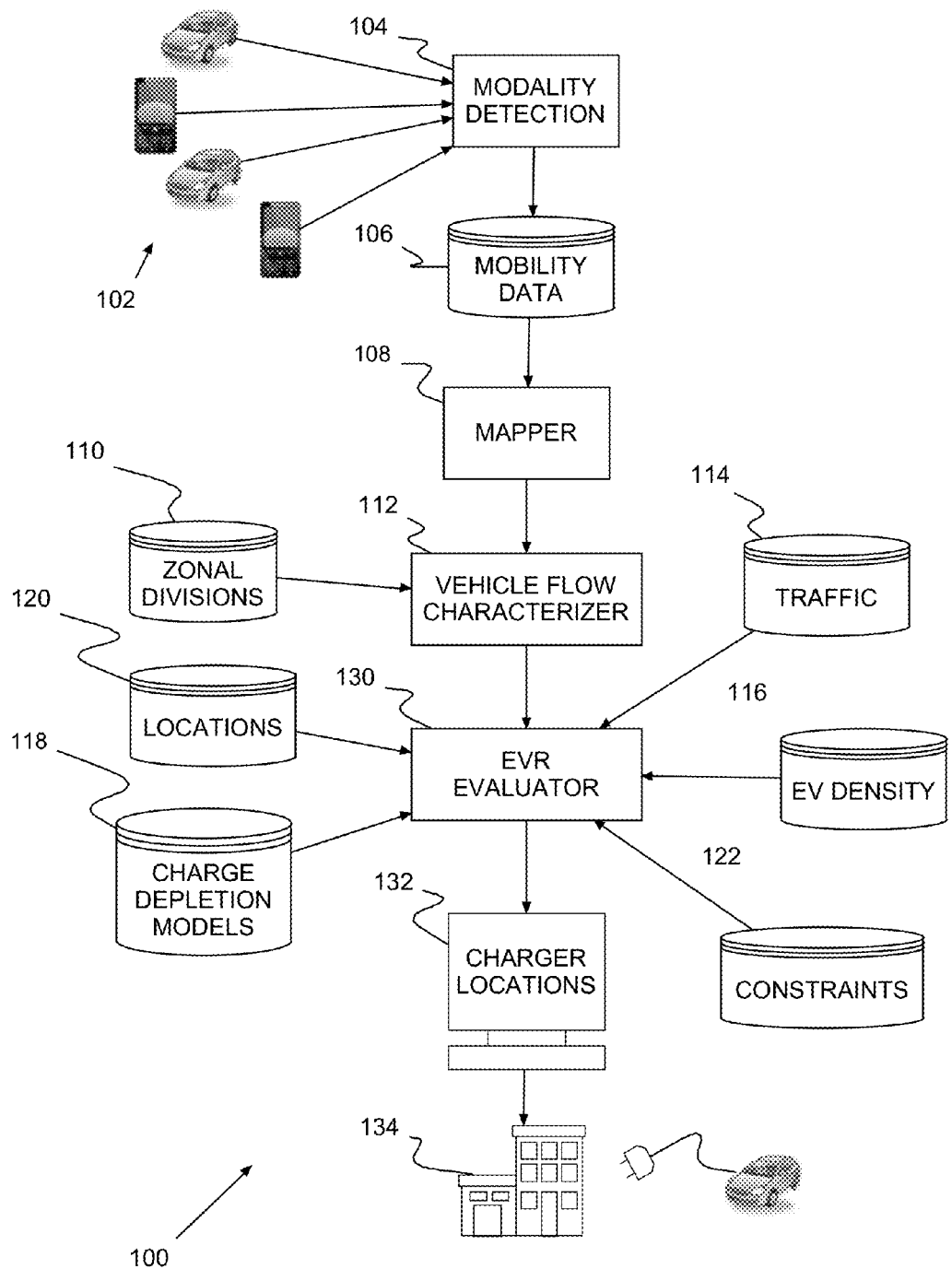
FIG. 1A shows an example of a system for determining an optimal number of, and location for Electric Vehicle (EV) charging stations according to a preferred embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Turning now to the drawings and more particularly, FIG. 1A shows an example of a system 100 for optimizing Electric Vehicle (EV) charging infrastructure, determining an optimal number of, and location for, EV charging stations according to a preferred embodiment of the present invention. A preferred system 100 includes one or more traffic sensors 102, a modality detection module 104, a mobility database 106, a map matching module 108, a zonal division database 110, a vehicle mobility flow module 112, a traffic characterization database 114, an EV density database 116, an EV charge depletion database 118, a location database 120 and a constraint database 122. An EV requirements (EVR) evaluator 130, e.g., a typical general purpose computer, generates 132, e.g., maps on a display or for printing, an optimal number of EV charging stations and the optimal placement of those stations. Finally, chargers are deployed where needed to selected locations 134 to equip locations as indicated, e.g., for commercial EV charging stations, traffic conditions, geographical conditions (incline etc.), and speed limits.

Thus, a preferred system 100 passively estimates spatio-temporal demand for EV charging in a geographical area or region, where the area or region has multiple zones. The system 100 captures anonymized data from sensors 102, e.g., cell phone towers, GPS devices and loop detectors, and estimates 112 total vehicles arriving in one zone from another, e.g., a Traffic Analysis Zone (TAZ) j from TAZ i, at time k and departing at time l. Then, the EVR evaluator 130 determines the demand for charge from arrival time and the dwell time at each TAZ j based on the assumption that each EV was completely charged when it departed from TAZ i and an estimate of charge dissipated traveling from TAZ i to TAZ j. The EVR evaluator 130 determines time-of-day demand for EV charging based on, for example, estimated EV market penetration 116 and charge utilization per mile 118.

It should be noted that although shown here as the databases 106, 110, 114,116, 118, 120, 122 being in individual separate individual storages, this is for example only. The databases 106, 110, 114,116, 118, 120, 122 may be stored grouped in one or more storages as appropriate that may be located local, centrally or remotely. Further, the preferred modules 104, 108, 112 and 130 may be operating in a single general purpose computer, in multiple such computers or in individual such computers, as desired.

Traffic sensors 102 provide vehicle type and can include, for example, vehicle location devices such as vehicles and/or cell phone mounted global positioning system (GPS) capability, vehicle on-board diagnostic (OBD) sensors, and call detail record (CDR) data, e.g., from cell phones. Vehicle type may include, for example, car, bus and bicycle. The raw traffic data matches vehicle type with the time of day and the location at which the sensors detect the vehicle.

The modality detection module 104 classifies collected raw sensor 102 data by vehicle type. First, the modality detection module 104 processes sensor data and identifies an associated mode of travel, e.g., car, bus and bike. Then, the modality detection module 104 deposits classified raw sensor data with its respective mode of travel in a mobility database 106, e.g., centrally located.

The map matching module 108 converts classified raw mobility data, collected in the mobility database 106, into routes and zones. Then, the map matching module 108 stores the result by route, time of day and zone in zonal division database 110.

The vehicle mobility flow module 112 converts mapped mobility data in zonal division database 110 into traffic flow, averaging traffic data over an extended period such as a few months. The resulting traffic flow may include, for example, the number of vehicles moving from one zone to another by time of the day. Preferably, the result includes the average number of vehicles flowing from zone i to zone j, that arrive in time slot k and leave in time slot l. Optionally, traffic flow may include classifying traffic by EV type, if available, e.g., from data collected directly from vehicle sensors.

The traffic characterization database 114 stores historical data on average vehicle speeds by time of day on streets. The EV density database 116 includes market penetration data for EVs.

The EV charge depletion database 118 models charge depletion as a function of average speed and vehicle type. State of the art EV charging infrastructure includes overnight charging stations at home or apartment, and opportunity-based commercial charging stations at locations such as offices, shopping malls, tourist locations etc. Currently, there are three (3) types of chargers. Level I chargers cost $0 and can charge an EV for about 8 miles in 1 hour. Level II chargers currently cost $2,500 new and can charge for about 28 miles in 1 hour. Level III chargers currently cost $25,000-$30,000 new and can charge for about 50 miles in 1 hour. Most homes have/are level I chargers, whereas level II and level III chargers are primarily used in commercial station locations.

The location database 120 includes data regarding key locations in the covered geographical area and that may be selectable for EV charging station locations, e.g., malls, commercial districts and schools. The constraint database 122 includes budget, policy and infrastructure constraints that are applied to generate an EV charging stations number and placement 132. The EVR evaluator 130 combines the traffic flow and traffic history with EV characteristics, constrained by budget, policy and infrastructure constraints to generate an optimum number EV charging stations and placement of the stations 132.

Figure 1B:
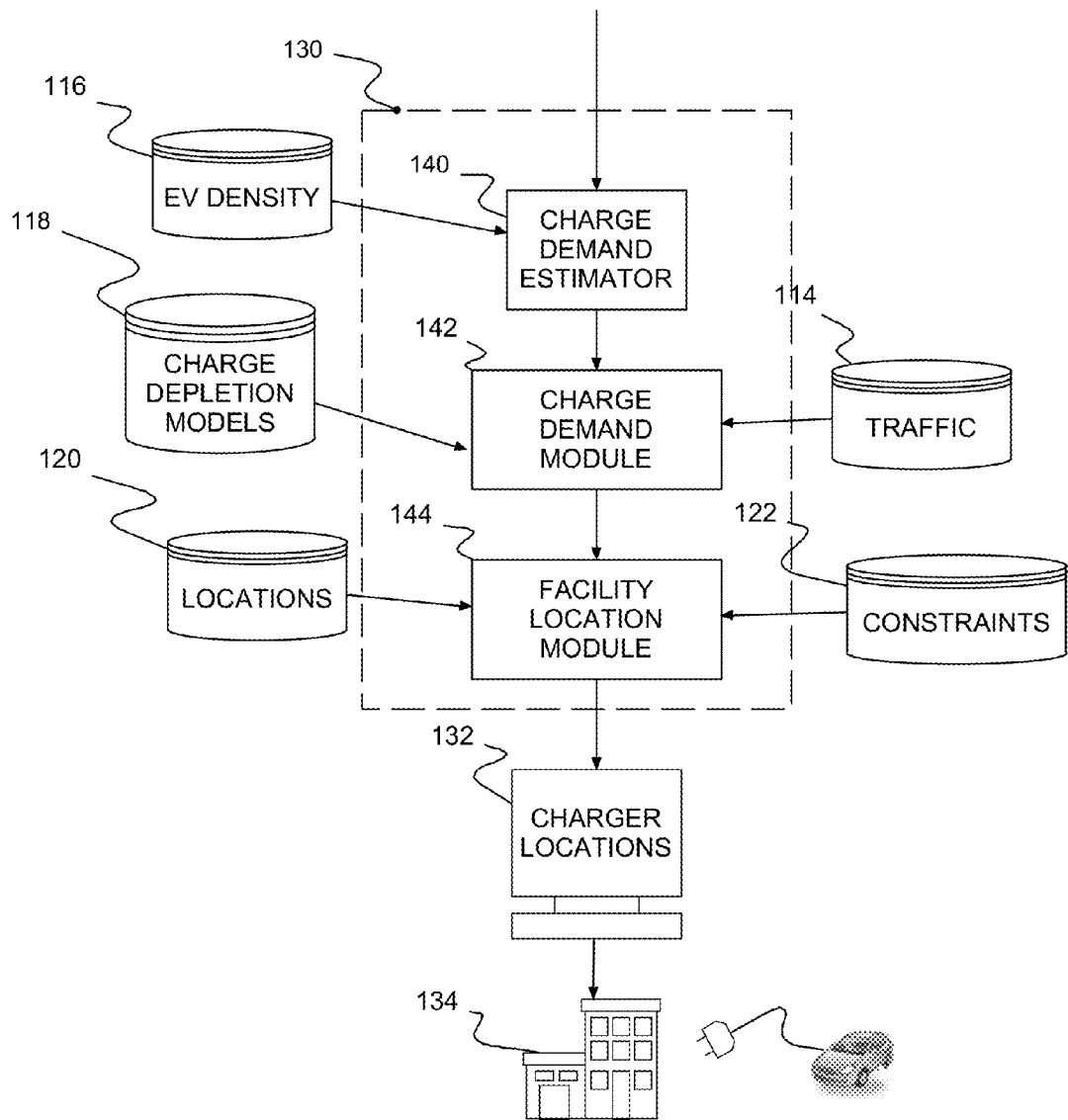
FIG. 1B shows an example of EV requirement prediction according to a preferred embodiment of the present invention.

So, as shown in the example of FIG. 1B, predicting EV infrastructure requirements begins by collecting raw mobility data 106, mapping 108 the raw data, and estimating traffic flow 112. Then, the EVR evaluator 130 uses geographical, budgetary and policy constraints in combination with the estimated demand, to determine the number of EV charging stations and their locations in a certain region. First, a charge demand estimation module 140 estimates EV charging demand. Then, the EVR evaluator 130 uses a charge demand module 142 and a facility location module 144 to recursively determine the optimal number of EV charging stations and the optimal placement of those stations 132.

In each iteration, the charge demand module 142 uses a scheduling model, that essentially considers the siting problem at one limit, i.e., unlimited by the number of station locations and with all types of stations available where and when needed. So, the charge demand module 142 uses the scheduling model for identifying the maximum number of required locations unconstrained by capacity, i.e., the maximum number of chargers of each type required to fully meet EV arrival and dwell time constraints. From this result, the facility location module 144, essentially, selects the optimum number of station locations to meet charging requirements within budget. So, the final result of each iteration includes a requisite number of chargers of each type in each location to meet the budget.

Using the site locations identified at the end of each current iteration, the charge demand module 142 reconsiders the siting problem at a tighter limit (i.e., the smaller set of locations identified in the prior iteration) and passes the results to the facility location module 144. This continues until the number and locations of sites does not change from iteration to iteration, or optionally, the changes do not exceed a selected threshold. The result 132 of the final iteration is the optimal number of EV charging stations and the optimal placement of those stations. The final results 132 are used to deploy 134 commercial EV charging stations, such that each location has an optimal number of chargers of each type.

So for example, a TAZ authority, such as a local government or an Architect/Engineer/Contractor (A/E/C) firm, can determine the expected demand for EV charging in a TAZ and/or the number of charging stations by type in the TAZ. From this, the TAZ authority can promulgate guidelines for locating charging stations at particular sites, e.g., malls or business districts or municipal parking lots. Utilities, for example, can design and build infrastructure to meet the expected demand for EV charging at those locations.

Figure 2:
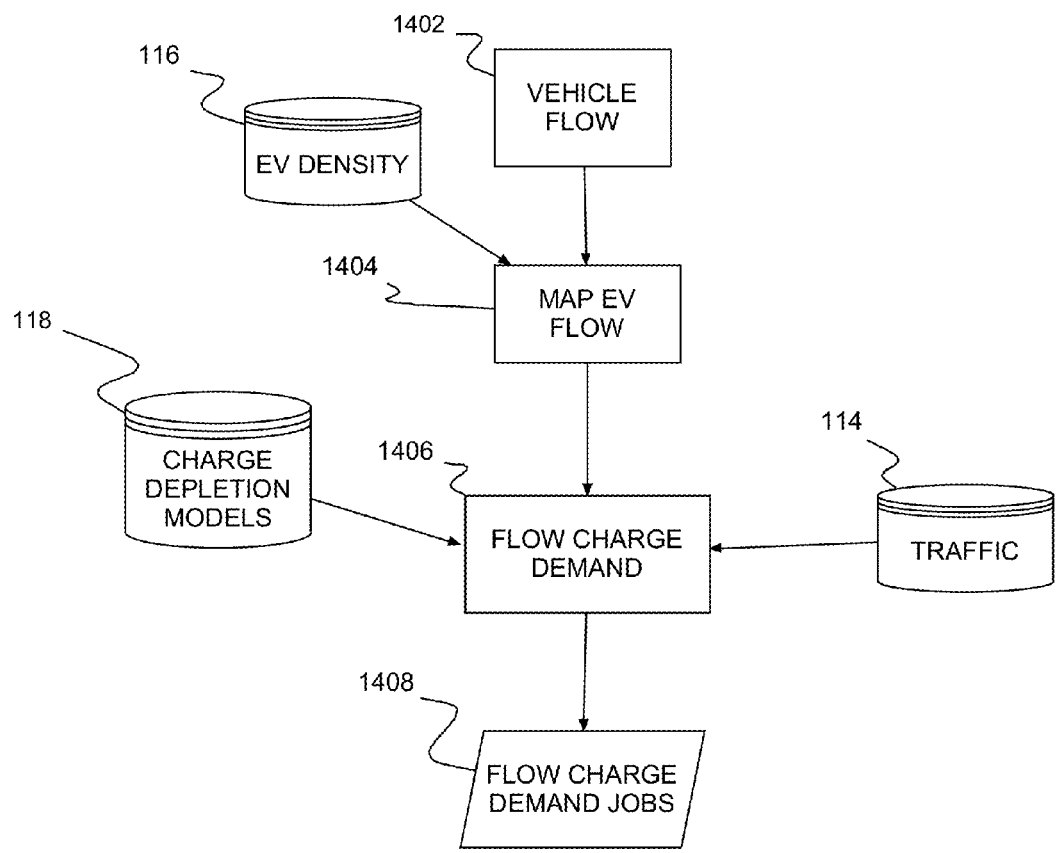
FIG. 2 shows an example of the EVR evaluator estimating EV charging demand from vehicle flow data.

FIG. 2 shows an example of the charge demand estimation module 140 estimating EV charging demand from vehicle flow data 1402. The vehicle flow data 1402 indicates the number of incoming vehicles moving from one zone to another by time of day and estimates the charge demand at each location, i.e., vehicles moving from origin i to destination j that dwell at j from time k to l. Using EV market penetration data from EV density database 116, the charge demand estimation module 140 maps zonal EV flow 1404, i.e., maps the number of incoming EVs from origin i to destination j that dwell at j from time k to l. Then, the charge demand estimation module 140 estimates 1406 charging demand for the EV flow 1404 based on traffic characterization data (e.g., vehicle type, distance traveled and speed) 114 and EV charge depletion data 118. Preferably, charging demand is based on EV user range anxiety, i.e., a selected charge time threshold that typically triggers recharging. The charge demand estimation module 140 represents demand 1408 as jobs, where each job i has charge demand $d_i$ and arrives at time k with charging completed by l.

Figure 3:
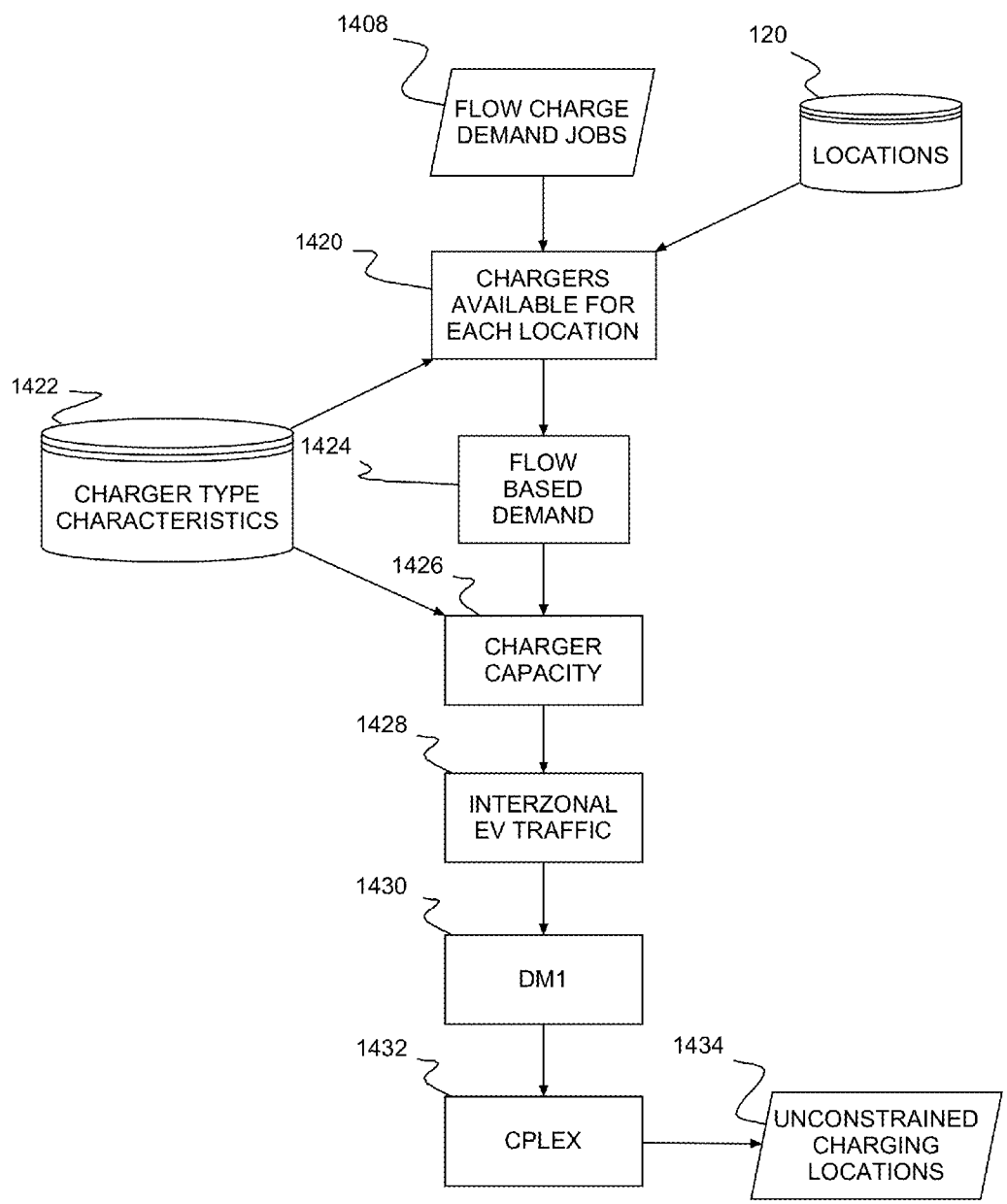
FIG. 3 shows an example of the EVR evaluator providing and using a charge demand module (DM1) for determining the optimum number of charging stations at each location.

FIG. 3 shows an example of the charge demand module 142 for determining a maximum number of charging station locations from demand jobs 1408. The charge demand module 142 begins by obtaining a list 1420 of the maximum number of chargers of each type that 1422 can be located at each candidate site. Then, the charge demand module 142 estimates demand 1424 based on the number of arriving EVs over time, the required charge for each, and expected length of stay at a particular location. The charge demand module 142 characterizes charge capacity 1426 for each charger type by estimating time each type of charger takes to charge various demand amounts. For example, an EV requiring a recharge to travel 25 miles, may require charging for approximately 3 hours on a type I charger, 1 hour on a type II and 30 minutes on a type III. Next, the charge demand module 142 characterizes inter-zonal traffic transitions 1428. The charge demand module 142 defines time slots, e.g., segmenting a period under study is into slots time. Then, the charge demand module 142 maps the arrival of EVs to either the lower or upper range of each time slot.

Then, in this example, the charge demand module 142 models 1430 scheduling problem as an objective function (DM1), predicting time-of-day demand for EV charging across a region, to obtain the minimum number of chargers of each type required at each candidate site to meet the demand as much as possible. Preferably, the EVR evaluator 130 passes the preferred optimization model (DM1) to a IBM ILOG® CPLEX 1432 solver, which provides the maximum number of the locations 1434 with a number of chargers at each location that meets demand for the area.

Preferably, the charge demand module 142 models the scheduling problem in the form of an objective function (DM1). A typical objective function may include, but is not limited to, for example: tasks that involve prediction/forecasting (e.g., financial forecasting and highway safety tasks); adaptive filtering and system identification tasks (e.g., adaptive equalizers and for speech/image recognition); data mining tasks (e.g., data clustering and fault/failure diagnosis); and, combinatorial optimization tasks (both linear and non-linear). Further, the US Government has defined an objective function as a "function associated with an optimization problem which determines how good a solution is, for instance, the total cost of edges in a solution to a traveling salesman problem." See, e.g., www.itl.nist.gov/div897/sqg/dads/HTML/objective.html. So essentially, an objective function relates various elements/parameters, that one varies to identify a maximum or minimum. By recursively locating or determining that maximum or minimum, one identifies an optimum arrangement of the elements.

So preferably, DM1 includes a single binary decision variable set, $X_{i,m,t}$, where $X_{i,m,t}=1$ if demand i is assigned for fulfillment at a charger m; and otherwise zero (0), i.e., $X_{i,m,t} \in 0,1$. DM1 parameters include: the set of chargers M; the set of charge demands I; the set of start time T of time slots; processing time $p_{i,m}$ of each demand i on each charger m; the time $r_i$ at which demand i is ready to begin charging; the required dwell time $w_i$ of each demand i; the time $d_i$ at which demand i departs, that is, begin time plus dwell ($r_i+w_i$); and the cost $C_m$ of installing charger m. Preferably, DM1 has three parts and has the form $$\min \sum_{i \in I} U_i + \sum_{i \in I} \sum_{t \in T} X_{i,m,t}(r_i + p_{i,m}) + \sum_{i \in I} p_{i,m} C_m X_{i,m,t}.$$

The first part, $$\sum_{i \in I} U_i,$$

represents unmet demand for charging. Minimizing this part ensures that demand most, if not all, is assigned to available chargers. The second part, $$\sum_{i \in I} \sum_{t \in T} X_{i,m,t}(r_i + p_{i,m}),$$

is the sum of completion times for all EVs processed on a certain charger. Minimizing this ensures that each demand begins processing as soon as it arrives, without undue delay, at one of the free, or soon-to-be free, chargers. The third part, $$\sum_{i \in I} p_{i,m} C_m X_{i,m,t},$$

assigns each demand to each charger. Minimizing this part results in the least possible product of cost of installation and processing time. This third part also guarantees that first and second components of the objective function are met while being accommodated on the least possible number of chargers.

It should be noted that each part is not minimized independent of the other parts. The overall relationship is minimized. Thus, for example, in some cases one part may dominate and provide a minimum result when one or both of the other parts is at a maximum. However, by constraining the preferred scheduling problem objective function to limit a single EV charging at any station at a time, and finding the minimum of DM1 under those constraints, the result of the initial iteration determines 142 the charging locations, the maximum number of charging stations, and station or charger types at each of the locations. In each subsequent iteration, the result determines 142 the maximum number of charging stations, station or charger types at culled locations, locations culled from the previous set by facility location module 144.

In each iteration, the preferred is constrained to limit EVs to real world charging constraints (i.e., each EV begins charging when it plugs in and continues until it finishes), and one EV per station. So, because an EV must arrive at a charger that is ready to charge it before it can begin charging, one constraint, $$\sum_{t \leq r_i} \sum_{m \in M} X_{i,m,t} = 0,$$

limits beginning to charge each EV to a time after a respective charging station ready or the EV arrival time. Also, charging each EV takes a given time to complete after it has begun at each station, and EVs typically charge fully before disconnecting. So, the preferred charge demand module is also constrained such that every EV completes charging at a respective due time by $$\sum_{t \geq d_i} \sum_{m \in M} X_{i,m,t} = 0.$$

Since some EVs may not completely charge during every period or time slot, e.g., if all stations are occupied or EVs that discharge during the current period, some demand may remain unmet. So, unmet demand, i.e., any EV that cannot charge or fails this to complete charging, is addressed by constraining the charge demand module by $$\sum_{t \in T} \sum_{m \in M} X_{i,m,t} p_{i,m} + U_i = 1 \ \forall \ i \in I.$$

Every charging EV must dwell at a charging station long enough to complete charging. Thus, a demand satisfaction constraint $$\sum_{t \in T} \sum_{m \in M} X_{i,m,t} p_{i,m} - w_i \leq 0 \ \forall \ i \in I,$$

ensures that EV demand is served by a charger where the processing time is less than the EV dwell time.

No more than one EV can charge in a charger or charging station at a time. So while some charging stations may be empty, each time slot begins with no more than one EV with demand in any charging station. Thus, the constraint, $$\sum_{t \in T} \sum_{m \in M} X_{i,m,t} \leq 1 \ \forall \ i \in I,$$

prevents multiple EVs from occupying the same charger m at the beginning of each time slot. While any EV is charging, it alone occupies a respective charging station. No other EV can be scheduled for that station for the duration of the processing time or charging duration. So, $$X_{i,m,t} + \sum_{j \in I; j \neq i} \sum_{\tau=t}^{t+p_{i,m}} X_{j,m;\tau} = 0 \ \forall \ i \in I, m \in M,$$

precludes scheduling multiple/other EVs during processing. Any unoccupied charger is free, and remains available for scheduling other EVs. To prevent ever assigning multiple EVs to the same station at any time and the resulting deadlock, the charge demand module is constrained by $$\sum_{j \in I; j \neq i} X_{i;m;\tau} \leq 1 \; \forall \, t \in T, m \in M,$$

which limits every station to no more than one EV at any instant in time, a charger has at most 1 car assigned to it.

Ideally, capacity equals demand and the located charging stations satisfy charging requirements of all EVs needing a charge and no EVs have unmet requirements, i.e., at full capacity. However, the preferred charge demand module 142 finds the limits of DM1 constrained according to the above constraints, and provides demand data at each location that, essentially, characterizing the level of charging at each location, initially for the entire set of locations and subsequently for a culled set of locations, with unlimited capacity at each location, i.e., unconstrained by capacity. The charge demand module 142 provides a result indicating the number of chargers of type t at each location and demand for each and the distances between all pairs of potential charger locations. The EVR evaluator 130 uses demand data at each location to constrain the location module 144 in determining which charging station locations are optimum and the type(s) of charger(s) at each.

Figure 4:
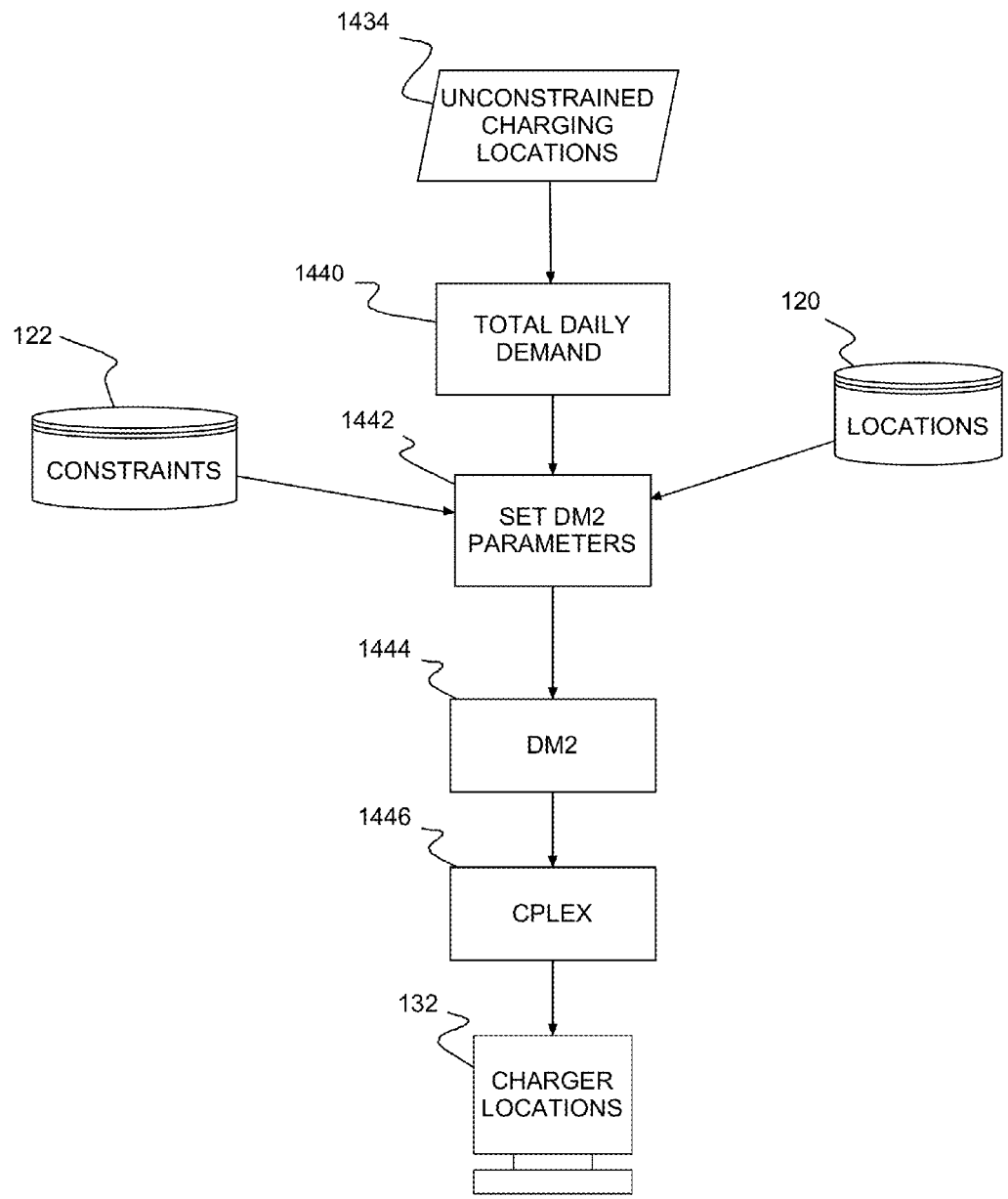
FIG. 4 shows an example of the EVR evaluator providing and using a location module (DM2) for determining optimum charging station location and respective charger type(s).

FIG. 4 shows an example of the facility location module 144 using a location model (DM2) to determine optimum charging station locations and respective charger type(s) at each. The facility location module 144 constrains the location model for charge demand with constraints that include: the set of candidate locations I to site EV charging stations; charger type t, where currently t=1, 2, 3; the maximum number of chargers $N_t^i$ of type t to be located at i; and, the distance $d_{ij}$ between candidate locations i and j. The facility location module 144 aggregates 1440 the time-of-day demand for each charger type t to obtain total daily demand $D_t^i$ for charger type t at i.

The facility location module 144 sets 1442 other location module parameters including: a distance threshold Z; charging capacity $w_t$ of charger type t; cost $C_t$ of installing a charger of type t; and total constraint on the budget B. Typically, the distance threshold, the cost of installing the chargers and the total constraint on the budget are dependent upon policy-related decisions, e.g., taken by government agencies or those contracted by the government to install EV charging stations. Charging capacity of each charger is defined by the physical attributes and construct of the charger itself.

Next, the facility location module 144 uses the facility location module (DM2) to determine 1444 an actual number of chargers $X_t^i$ of type t located at i; the actual demand $Y_t^{ij}$ for charger type t at i satisfied at j; and the actual demand $Y_t^i$ for charger type t located at i satisfied at i, where $X_t^i, Y_t^i, Y_t^{ij} \geq 0$. Preferably, the facility location module 144 makes this determination by passing 1444 the location model (DM2) to a IBM ILOG® CPLEX solver, which culls the candidate locations. Preferably, DM2 is an objective function for location optimization having the form $$\max \sum_{t=1,2,3} \left[ \sum_{i \in I} \left( D_t^i - Y_t^i - \frac{1}{d_{ij}} \sum_{j \mid d_{ij} \leq Z} Y_t^{ij} \right) \right].$$

Thus, DM2 takes into account the maximum number of chargers at each location, budget constraints, key location database and distances between zones and solves the facility location problem to find the optimal number of charging stations and their locations from the set of candidate locations. For subsequently upgrading the area, e.g., for increased EV activity and volume, the locations may be constrained for existing charging stations and capacity, e.g., by set the cost of existing, in-place chargers to 0. With each iteration, the results are compared with the results from the previous iteration and, as long as they do not match, the results are returned to the charge demand module for the next iteration. Matching results provide the optimal number of charging stations and their locations 132. Finally, the results are used to locate 134 commercial EV charging stations and place an optimal number of chargers of each type in each location.

Thus advantageously, a preferred system passively collects mobility data from commuters; utilizes collected data to determine EV charging demand at various times in a day; and, finally, sites EV charging stations in response to demand. Accordingly, the sited EV charging stations facilitate quick refueling and increase EV travel ranges, thereby, allowing EV owners to travel freely without concern for being stranded in a discharged EV and no available charging facility.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of locating charging stations comprising:
   collecting traffic information from a plurality of traffic sensors;
   mapping traffic in an area;
   determining flow through zones in said area with respect to time;
   recursively determining a number of charging stations and respective locations for siting said charging stations, wherein recursively determining comprises:
      providing a set of locations for siting charging stations in said area,
      modeling charge demand, the charge demand model identifying a subset of said set of locations with charging EVs as a set of candidate locations and indicating charger use of a plurality of chargers located in each of said set of candidate locations, modeling facility locations, constraining the facility location model according charger capability at each location, budget constraints, and distances between zones to cull said set of candidate locations, comparing said set of candidate locations against said set of locations, and when the sets match providing said set of candidate locations and chargers at each location, said set of candidate locations being a set of locations for EV stations; and displaying recursively determined charging station sites.

2. A method as in claim 1, wherein for the set of chargers M; the set of charge demands I; the set of start time T of time slots; processing time $p_{i,m}$ of each demand i on each charger m; the time $r_i$ at which demand i is ready to begin charging; the required dwell time $w_i$ of each demand i; the time $d_i$ at which demand i departs, that is, begin time plus dwell $(r_i+w_i)$; the cost $C_m$ of installing charger m; and said charge demand model has the form $$\min \sum_{i \in I} U_i + \sum_{i \in I} \sum_{i \in T} X_{i,m,t}(r_i + p_{i,m}) + \sum_{i \in I} p_{i,m} C_m X_{i,m,t},$$

where $$\sum_{i \in I} U_i,$$

provides unmet demand for charging, $$\sum_{i \in I} \sum_{i \in T} X_{i,m,t}(r_i + p_{i,m}),$$

is the sum of completion times for all EVs processed on a certain charger, $$\sum_{i \in I} p_{i,m} C_m X_{i,m,t},$$

assigns each demand to each charger, $X_{i,m,t}=1$ if demand i is assigned for fulfillment at a charger m, and otherwise zero (0), i.e., $X_{i,m,t} \in 0,1$.

3. A system as in claim 1, wherein for the set of candidate locations I to site EV charging stations; a charger type t, where t=1, 2, 3; the maximum number of chargers $N_t^i$ of type t to be located at i; and, the distance $d_{ij}$ between candidate locations i and j; the total daily demand $D_t^i$ for charger type t at i; a distance threshold Z; charging capacity $w_t$ of charger type t; cost $C_t$ of installing a charger of type t; and total constraint on the budget B; the actual number of chargers $X_t^i$ of type t located at i, the actual demand $Y_t^{ij}$ for charger type t at i satisfied at j, and the actual demand $Y_t^i$ for charger type t located at i satisfied at i, where $X_t^i, Y_t^i, Y_t^{ij} \geq 0$; said facility location model, has the form $$\max \sum_{t=1,2,3} \left[ \sum_{i \in I} \left( D_t^i - Y_t^i - \frac{1}{d_{ij}} \sum_{j \mid d_{ij} \leq Z} Y_t^{ij} \right) \right].$$

4. A method of as in claim 1, whenever said set of candidate locations does not match said set of locations, returning to model charge demand with said set of candidate locations as said set of locations, said method further comprising locating ones of said charging stations at each said respective location in said set of locations for EV stations.

5. A method as in claim 1, wherein collecting traffic information comprises identifying an associated mode of travel for collected data.

6. A method as in claim 5, wherein associated modes of travel include car, bus and bike, and recursively determining further determines the type of chargers at said each respective location.

7. A computer program product for locating charging stations, said computer program product comprising a computer usable medium having computer readable program code stored thereon, said computer readable program code causing a computer executing said code to:

collect traffic information from a plurality of traffic sensors;

map traffic in an area;

determine flow through zones in said area with respect to time;

recursively determine a number of charging stations and respective locations for siting said charging stations in said area, wherein recursively determining further causes said computer to:

provide a set of locations for siting charging stations in said area, solve a charge demand objective function, the charge demand objective function solution identifying locations with charging EVs as a set of candidate locations and indicating charger use of a plurality of chargers located in each of said set of candidate locations, solve a facility location objective function, the facility location objective function solution culling said set of candidate locations according charger capability at each location, budget constraints, and distances between zones, compare said set of candidate locations against said set of locations, return to solve said charge demand objective function with said set of candidate locations as said set of locations until said set of candidate locations match said set of locations, and when the sets match provide said set of candidate locations and chargers at each location, said set of candidate locations being a set of locations for EV stations; and display recursively determined charging station sites.

8. A computer program product for routing travel as in claim 7, wherein for the set of chargers M; the set of charge demands I; the set of start time T of time slots; processing time $p_{i,m}$ of each demand i on each charger m; the time $r_i$ at which demand i is ready to begin charging; the required dwell time $w_i$ of each demand i; the time $d_i$ at which demand i departs, that is, begin time plus dwell $(r_i+w_i)$; the cost $C_m$ of installing charger m; and said charge demand objective function has the form $$\min \sum_{i \in I} U_i + \sum_{i \in I} \sum_{i \in T} X_{i,m,t}(r_i + p_{i,m}) + \sum_{i \in I} p_{i,m} C_m X_{i,m,t},$$

where $$\sum_{i \in I} U_i,$$

provides unmet demand for charging, $$\sum_{i \in I} \sum_{t \in T} X_{i,m,t}(r_i + p_{i,m}),$$

is the sum of completion times for all EVs processed on a certain charger, $$\sum_{i \in I} p_{i,m} C_m X_{i,m,t},$$

assigns each demand to each charger, $X_{i,m,t}=1$ if demand i is assigned for fulfillment at a charger m, and otherwise zero (0), i.e., $X_{i,m,t} \epsilon 0,1$.

9. A computer program product for routing travel as in claim 7, wherein for the set of candidate locations I to site EV charging stations; a charger type t, where t=1, 2, 3; the maximum number of chargers $N_t^i$ of type t to be located at i; and, the distance $d_{ij}$ between candidate locations i and j; the total daily demand $D_t^i$ for charger type t at i; a distance threshold Z; charging capacity $w_t$ of charger type t; cost $C_t$ of installing a charger of type t; and total constraint on the budget B; the actual number of chargers $X_t^i$ of type t located at i, the actual demand $Y_t^{ij}$ for charger type t at i satisfied at j, and the actual demand $Y_t^i$ for charger type t located at i satisfied at i, where $X_t^i, Y_t^i, Y_t^{ij} \geq 0$; said location objective function, has the form $$\max \sum_{t=1,2,3} \left[ \sum_{i \in I} \left( D_t^i - Y_t^i - \frac{1}{d_{ij}} \sum_{j | d_{ij} \leq Z} Y_t^{ij} \right) \right].$$

10. A computer program product for routing travel as in claim 7, wherein collected traffic information identifies an associated mode of travel for collected data.

11. A computer program product for routing travel as in claim 10, wherein associated modes of travel include car, bus and bike, and recursively determining further causes said computer to determine the type of chargers at said each respective location.

12. A system for siting charging stations in an area, said system comprising:
a plurality of vehicle sensors distributed in an area;
a modality detection module collecting traffic data from said vehicle sensors;
a map matching module mapping detected traffic in said area;
a vehicle flow module temporally characterizing mapped traffic flow in said area; and
an electric vehicle (EV) requirements (EVR) evaluator determining a number of charging stations and respective locations for siting said charging stations in said area responsive to characterized traffic flow, wherein said modality detection module identifies an associated mode of travel for collected data and said EVR evaluator comprises:
a demand estimator estimating demand at each prospective charging station location,
a charge demand module determining the maximum number of charging station locations to meet all demand, wherein said charge demand module comprises a charge demand optimization model to determine said maximum number of charging station locations as a set of candidate locations, and wherein for the set of chargers M; the set of charge demands I; the set of start time T of time slots; processing time $p_{i,m}$ of each demand i on each charger m; the time $r_i$ at which demand i is ready to begin charging; the required dwell time $w_i$ of each demand i; the time $d_i$ at which demand i departs, that is, begin time plus dwell ($r_i + w_i$); the cost $C_m$ of installing charger m; and said demand optimization model has the form $$\min \sum_{i \in I} U_i + \sum_{i \in I} \sum_{t \in T} X_{i,m,t}(r_i + p_{i,m}) + \sum_{i \in I} p_{i,m} C_m X_{i,m,t},$$

where $$\sum_{i \in I} U_i,$$

provides unmet demand for charging, $$\sum_{i \in I} \sum_{t \in T} X_{i,m,t}(r_i + p_{i,m}),$$

is the sum of completion times for all EVs processed on a certain charger, $$\sum_{i \in I} p_{i,m} C_m X_{i,m,t},$$

assigns each demand to each charger, $X_{i,m,t}=1$ if demand i is assigned for fulfillment at a charger m, and otherwise zero (0), i.e., $X_{i,m,t} \epsilon 0,1$, and
a facility location module selecting the charging station locations to meet spatio-temporal charging requirements, said facility location module using a location model to select said charging station locations from said set of candidate locations, and wherein said charge demand module and facility location module iteratively determine said number of charging stations and said respective locations for siting said charging stations.

13. A system as in claim 12, wherein said EVR evaluator uses an objective function to determine said number of charging stations and said respective locations, said objective function comprising said charge demand module and said location module.

14. A system as in claim 13 wherein on each iteration
said charge demand module is constrained such that only one EV charges at a time in each station and, once begun charging continues until complete; and
said location module is constrained by the maximum number of chargers at each location, budget constraints, key location database and distances between zones.

15. A system for siting charging stations in an area, said system comprising:

a plurality of vehicle sensors distributed in an area;
a modality detection module collecting traffic data from said vehicle sensors;
a map matching module mapping detected traffic in said area;
a vehicle flow module temporally characterizing mapped traffic flow in said area; and
an electric vehicle (EV) requirements (EVR) evaluator determining a number of charging stations and respective locations for siting said charging stations in said area responsive to characterized traffic flow, wherein said modality detection module identifies an associated mode of travel for collected data and said EVR evaluator comprises:
   a demand estimator estimating demand at each prospective charging station location,
   a charge demand module determining the maximum number of charging station locations to meet all demand, wherein said charge demand module comprises a charge demand optimization model to determine said maximum number of charging station locations as a set of candidate locations, and wherein for the set of candidate locations I to site EV charging stations; a charger type t, where t=1, 2, 3; the maximum number of chargers $N_t^i$ of type t to be located at i; and, the distance $d_{ij}$ between candidate locations i and j; the total daily demand $D_t^i$ for charger type t at i; a distance threshold Z; charging capacity $w_t$ of charger type t; cost $C_t$ of installing a charger of type t; and total constraint on the budget B; the actual number of chargers $X_t^i$ of type t located at i, the actual demand $Y_t^{ij}$ for charger type t at i satisfied at j, and the actual demand $Y_t^i$ for charger type t located at i satisfied at i, where $X_t^i, Y_t^i, Y_t^{ij} \geq 0$; said location model, has the form $$\max_{t=1,2,3} \Sigma \left[ \sum_{i \in I} \left( D_t^i - Y_t^i - \frac{1}{d_{ij}} \sum_{j | d_{ij} \leq Z} Y_t^{ij} \right) \right].$$

and
   a facility location module selecting the charging station locations to meet spatio-temporal charging requirements, said facility location module using a location model to select said charging station locations from said set of candidate locations, and wherein said charge demand module and facility location module iteratively determine said number of charging stations and said respective locations for siting said charging stations.

16. A system as in claim 15, wherein associated modes of travel comprises car, bus and bike.

17. A computer program product for siting charging stations in an area, said computer program product comprising a computer usable medium having computer readable program code stored thereon, said computer readable program code comprising:
   computer readable program code means for receiving traffic data from a plurality of vehicle sensors distributed in an area;
   computer readable program code means for collecting traffic data from said vehicle sensors;
   computer readable program code means for mapping detected traffic in said area;
   computer readable program code means for temporally characterizing mapped traffic flow; and
   computer readable program code means for determining a number of electric vehicle (EV) charging stations and respective locations for siting said EV charging stations responsive to characterized traffic flow, wherein said computer readable program code means for collecting traffic data identifies an associated mode of travel for collected traffic data, said computer readable program code means for determining a number of EV charging stations comprising:
      computer readable program code means for estimating demand at each prospective charging station location,
      computer readable program code means for determining the maximum number of charging station locations to meet all demand, wherein determining the maximum number of charging station locations determines said maximum number of charging station locations as a set of candidate locations, and, wherein for the set of chargers M; the set of charge demands I; the set of start time T of time slots; processing time $p_{i,m}$ of each demand i on each charger m; the time $r_i$ at which demand i is ready to begin charging; the required dwell time $w_i$ of each demand i; the time $d_i$ at which demand i departs, that is, begin time plus dwell ($r_i$+$w_i$); the cost $C_m$ of installing charger m; and wherein determining the maximum number of charging station locations has the form $$\min \sum_{i \in I} U_i + \sum_{i \in I} \sum_{i \in T} X_{i,m,t}(r_i + p_{i,m}) + \sum_{i \in I} p_{i,m} C_m X_{i,m,t},$$

where $$\sum_{i \in I} U_i,$$

provides unmet demand for charging, $$\sum_{i \in I} \sum_{i \in T} X_{i,m,t}(r_i + p_{i,m}),$$

is the sum of completion times for all EVs processed on a certain charger, $$\sum_{i \in I} p_{i,m} C_m X_{i,m,t},$$

assigns each demand to each charger, $X_{i,m,t}=1$ if demand i is assigned for fulfillment at a charger m, and otherwise zero (0), i.e., $X_{i,m,t} \epsilon 0,1$, and
      computer readable program code means for selecting the charging station locations to meet spatio-temporal charging requirements, wherein selecting the charging station locations selects said charging station locations from said set of candidate locations, and wherein said computer readable program code means for determining and computer readable program code means for selecting iteratively determine said number of said EV charging stations and said respective locations for siting said EV charging stations.

18. A computer program product for siting charging stations as in claim 17, said computer readable program code means for identifying associated modes of travel selects travel mode from the group comprising car, bus and bike.

19. A computer program product for siting charging stations in an area, said computer program product comprising a computer usable medium having computer readable program code stored thereon, said computer readable program code comprising:

computer readable program code means for receiving traffic data from a plurality of vehicle sensors distributed in an area;

computer readable program code means for collecting traffic data from said vehicle sensors;

computer readable program code means for mapping detected traffic in said area;

computer readable program code means for temporally characterizing mapped traffic flow; and computer readable program code means for determining a number of electric vehicle (EV) charging stations and respective locations for siting said EV charging stations responsive to characterized traffic flow, wherein said computer readable program code means for collecting traffic data identifies an associated mode of travel for collected traffic data, said computer readable program code means for determining a number of EV charging stations comprising:

computer readable program code means for estimating demand at each prospective charging station location, computer readable program code means for determining the maximum number of charging station locations to meet all demand, wherein determining the maximum number of charging station locations determines said maximum number of charging station locations as a set of candidate locations, wherein for the set of candidate locations I to site EV charging stations; a charger type t, where t=1, 2, 3; the maximum number of chargers $N_t^i$ of type t to be located at i; and, the distance $d_{ij}$ between candidate locations i and j; the total daily demand $D_t^i$ for charger type t at i; a distance threshold Z; charging capacity $w_t$ of charger type t; cost $C_t$ of installing a charger of type t; and total constraint on the budget B; the actual number of chargers $X_t^i$ of type t located at i, the actual demand $Y_t^{ij}$ for charger type t at i satisfied at j, the actual demand $Y_t^i$ for charger type t located at i satisfied at i, where $X_t^i, Y_t^i, Y_t^{ij} \geq 0$; and wherein selecting the charging station locations has the form $$\max \sum_{t=1,2,3} \left[ \sum_{i \in I} \left( D_t^i - Y_t^i - \frac{1}{d_{ij}} \sum_{j \mid d_{ij} \leq Z} Y_t^{ij} \right) \right],$$

and computer readable program code means for selecting the charging station locations to meet spatio-temporal charging requirements, wherein selecting the charging station locations selects said charging station locations from said set of candidate locations, and wherein said computer readable program code means for determining and computer readable program code means for selecting iteratively determine said number of said EV charging stations and said respective locations for siting said EV charging stations.

20. A computer program product for siting charging stations as in claim 19, wherein said computer readable program code means for determining a number of EV charging stations comprises an objective function for determining said number of EV charging stations and said respective locations.

21. A computer program product for siting charging stations as in claim 20, wherein on each iteration said computer readable program code means for determining the maximum number of charging station locations is constrained such that only one EV charges at a time in each station and, once begun charging continues until complete; and said computer readable program code means for selecting the charging station locations is constrained by the maximum number of chargers at each location, budget constraints, key location database and distances between zones.

* * * * *